(12) United States Patent
Wells

(10) Patent No.: US 11,565,765 B1
(45) Date of Patent: Jan. 31, 2023

(54) SCOOTER

(71) Applicant: Dennis Wells, Lake Wales, FL (US)

(72) Inventor: Dennis Wells, Lake Wales, FL (US)

( * ) Notice: Subject to any disclaimer, the term of this patent is extended or adjusted under 35 U.S.C. 154(b) by 200 days.

(21) Appl. No.: 17/181,530

(22) Filed: Feb. 22, 2021

(51) Int. Cl.
  *B62K 15/00* (2006.01)
  *B62K 3/00* (2006.01)

(52) U.S. Cl.
  CPC ............ *B62K 15/006* (2013.01); *B62K 3/002* (2013.01)

(58) Field of Classification Search
  CPC .............................. B62K 3/002; B62K 15/006
  See application file for complete search history.

(56) References Cited

U.S. PATENT DOCUMENTS

| | | | |
|---|---|---|---|
| 6,158,752 A | 12/2000 | Kay | |
| 6,193,249 B1 * | 2/2001 | Buscaglia | B62K 3/002 280/11.233 |
| 6,206,390 B1 * | 3/2001 | Borg | A63C 17/26 280/268 |
| 7,178,813 B1 * | 2/2007 | Bruntmyer | B60B 33/0039 280/87.041 |
| 8,459,669 B2 | 6/2013 | Lin | |
| 8,632,084 B2 * | 1/2014 | Lovley, II | B62K 3/002 280/87.041 |
| 9,186,570 B1 * | 11/2015 | Wells | A63C 17/0033 |
| 9,376,158 B1 * | 6/2016 | McCormick | B62K 3/002 |
| 11,077,357 B2 * | 8/2021 | Chen | A63C 17/014 |
| 2007/0278758 A1 * | 12/2007 | Kwak | A63C 17/016 280/87.042 |
| 2012/0086181 A1 * | 4/2012 | Kinnaman | A63C 17/06 29/428 |
| 2012/0161409 A1 * | 6/2012 | Young | A63C 17/012 280/87.042 |

* cited by examiner

*Primary Examiner* — Katy M Ebner
(74) *Attorney, Agent, or Firm* — Edward P Dutkiewicz

(57) ABSTRACT

A Scooter comprising a base board and a pair of rear casters. A flexible band couples and coordinates the rotation of each of the rear caster wheels. The Scooter has a forward hand grip subassembly which comprises a mounting foot, a rearwardly directed leg, a tubular neck, a steering shaft having at least one wheel, and a directional control member having a pair of associated hand grips coupled removably coupled thereto.

11 Claims, 5 Drawing Sheets

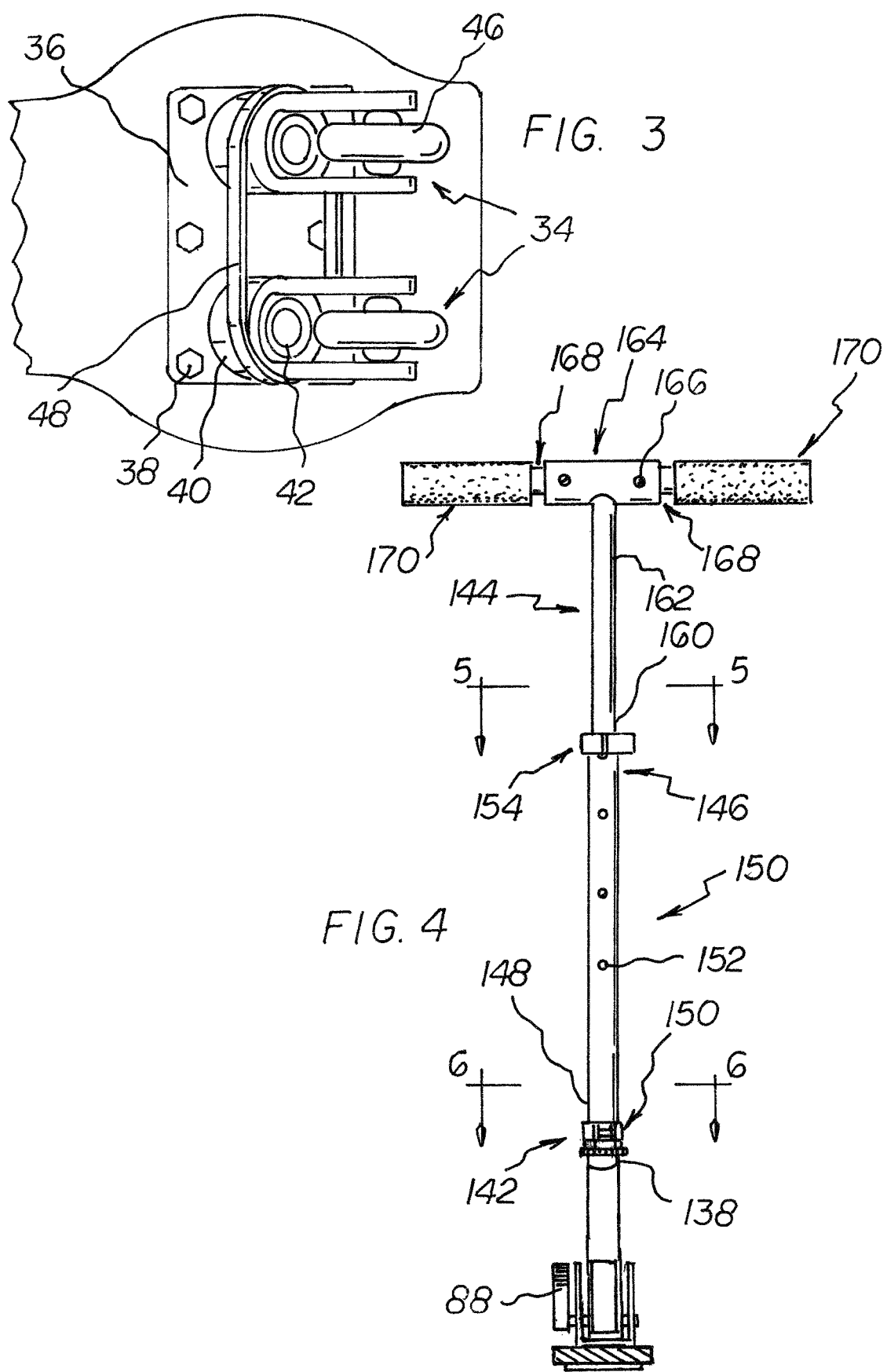

SCOOTER

BACKGROUND OF THE INVENTION

Rule 1.78(F) (1) Disclosure

The Applicant has not submitted a related pending or patented non-provisional application within two months of the filing date of this present application. The invention is made by a single inventor, so there are no other inventors to be disclosed. This application is not under assignment to any other person or entity at this time.

There are no cross referenced or related applications which are direct to, or related to, the present application.

There is no research of development of this application which is federally sponsored.

FIELD OF THE INVENTION

The present invention relates to a Scooter and more particularly pertains to light weight, and collapsible, transportation device.

DESCRIPTION OF THE PRIOR ART

The use of scooters for transportation is known in the prior art. More specifically, scooters for transportation previously devised and utilized for the purpose of providing a user with a simple form of transportation are known to consist basically of familiar, expected, and obvious structural configurations, notwithstanding the number of designs encompassed by the prior art which has been developed for the fulfillment of countless objectives and requirements.

While the prior art devices fulfill their respective, particular objectives and requirements, the prior art does not describe Scooter that allows light weight, and collapsible, transportation device.

In this respect, the Scooter, according to the present invention, substantially departs from the conventional concepts and designs of the prior art, and in doing so provides an apparatus primarily developed for the purpose of light weight, and collapsible, transportation device.

Therefore, it can be appreciated that there exists a continuing need for a new and improved Scooter which can be used for light weight, and collapsible, transportation device. In this regard, the present invention substantially fulfills this need.

SUMMARY OF THE INVENTION

In view of the foregoing disadvantages inherent in the known types of scooters for transportation now present in the prior art, the present invention provides an improved Scooter. As such, the general purpose of the present invention, which will be described subsequently in greater detail, is to provide a new and improved Scooter which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

In describing aspects of the invention, the word "generally" may be used. The term, "generally" when used to describe a configuration means that the configuration includes those aspects which are within normal manufacturing parameters of acceptance. By way of example, the term "generally round" may be used. This should be interpreted to mean that the configuration may be perfectly round, but may also have a radius which is not exact, but is within the manufacturing parameters. For example, a basketball may be generally round, but not be perfectly round.

The term, generally oval, means that the structure has an overall oval appearance, but may not be a perfect oval, meaning that the minor diameter may be blunted, or squared. The term generally oval means that the structure has an appearance of being representative of an oval structure.

By adjacent to a structure is meant that the location is near the identified structure.

To attain this, the present invention essentially comprises a scooter, which is herein described.

There is a base board. The base board has an upper surface and a lower surface, with a height there between. The base board also has an edge, which is defined by the height between the upper surface and the lower surface of the base board. The upper surface of the base board has an abrasive coating.

The base board has a forward portion and forward terminus. The base board has a rearward portion and a rearward terminus. The base board has a length between the forward terminus and the rearward terminus. The rearward portion of the base board has a first width. The forward portion of the base board has a second width. The first width of the base board is greater than the second width of the base board. The base board upper surface abrasive coating aids in preventing the slipping of a user's foot.

There is a pair of rear casters. The rear casters each have a base board contacting plate, with the base contacting plate of the rear casters having a plurality of associated fixing means. Fixing means are at least one of a class of fixing means which contains, bolts, snaps, clips, weldments, solders, pins, rivets, tongue and groove, threads, and wires.

Each of the rear casters has a fixed stanchion. Each of the rear casters has a rotating wheel mounting portion. Each of the rear caster wheel mounting portions has an associated axle and an associated wheel. Each of the rear casters rotating wheel mounting portions is coupled by a flexible elastomeric band which operates to coordinate the rotation of each of the rear caster wheel mounting portions.

There is a forward hand grip subassembly. The forward handgrip subassembly comprises several components, in combination. There is a forward hand grip subassembly lower mounting plate. The lower mounting plate of the forward hand grip subassembly has a generally rectilinear configuration, with an upper surface, a lower surface, and a width there between. The lower plate of the forward hand grip subassembly has a plurality of mounting bolt holes there through, with a plurality of associated lower plate mounting bolts.

The forward hand grip subassembly has a mounting foot. The mounting foot of the forward hand grip subassembly has a generally C-shaped configuration, with a lower base board portion, an upper portion, with a length there between. The lower base board portion of the mounting foot of the forward hand grip subassembly has generally rectilinear configuration with a plurality of bolt holes there through. The lower base board portion of the mounting foot of the forward hand grip subassembly is coupled to the lower plate of the forward hand grip subassembly by the mounting bolts, which are associated with the lower plate of the forward hand grip subassembly. The lower plate mounting bolts passing through the lower plate, through the forward portion of the base board, and through the lower base board portion of the mounting foot.

The upper portion of the mounting foot of the forward hand grip subassembly having a left side, a right side, and a bottom surface thereby forming a generally C-shaped upwardly oriented channel. The upwardly oriented channel has a pivot pin hole running through the left side and the right side of the upper portion of the mounting foot. The upwardly oriented channel of the mounting foot also has a lever mounting hole through the left side and the right side of the upper portion of the mounting foot of the forward hand grip subassembly. The lever mounting hole has an associated lever mounting pin.

The C-shaped upwardly oriented channel has a position locking component which has a locking arm and a locking arm lever. The locking arm and the locking arm lever are coupled to the lever mounting pin. The position locking component allows the forward hand grip subassembly to have a stored orientation and a deployed orientation. The locking arm has an associated spring.

The forward hand grip subassembly has a rearwardly directed leg. The rearwardly directed leg having a generally rectilinear configuration with an upper surface, a lower surface, a right surface, and a left surface. The rearwardly directed leg having an upper opening. The rearwardly directed leg having a lower opening which has a pair of pivot pin tabs.

The forward hand grip subassembly rearwardly directed leg pivot pin tabs each have a tab pivot pin hole there through. The tab pivot pin holes have an associated tab pivot pin. The tab pivot pin rotatably couples the forward hand grip subassembly rearwardly directed leg and the forward hand grip subassembly mounting foot, with the locking component capable of maintaining the forward hand grip subassembly in the deployed orientation and in the stored orientation.

The forward hand grip subassembly has a tubular neck. The rearwardly directed leg is fixedly coupled to the tubular neck. The tubular neck having a generally round passageway there through. The tubular neck has a threaded upper end and a threaded lower end. The tubular neck upper end and tubular neck lower end each containing a bearing therein. The upper end bearing and lower end bearing are held in position by a tubular neck upper nut which is threadedly attached to the tubular neck upper end, and a tubular neck lower nut which is threadedly attached to the tubular neck lower end.

The forward hand grip subassembly has a steering shaft. The steering shaft has a lower wheel end. The lower wheel end has a generally C-shaped configuration with a pair of wheel mounting tabs. The wheel mounting tabs of the steering shaft each have a wheel axle hole there through. The wheel axle holes of the wheel mounting tabs have an associate wheel axle. The lower wheel end of the steering shaft has an associated front steering wheel. The steering shaft has an upper rotation end. The upper rotation end of the steering shaft of the forward hand grip subassembly is rotatably coupled to, and is inserted through, the tubular neck of the forward hand grip subassembly.

The forward hand grip subassembly has a directional control member. The directional control member of the forward hand grip subassembly has a lower component and an upper component. The lower component of the directional control member has a generally rounded hollow tubular configuration, with an upper extent, a lower extent, and a length there between. The lower extent of the lower component of the directional control member has an associated clamp. The length between the lower extent and the upper extent of the lower component of the directional control member has a plurality of detent holes therein. The upper extent of the lower component of the directional control member has a engageable clamp with an associated polymer bushing.

The forward hand grip subassembly directional control member upper component has a generally oval configuration, with the oval configuration having a lower end and an upper end, with a length there between. The length of the upper component of the directional control member has a first detent mechanism for allowing the upper component of the directional control member to be movably fixed to the lower component detent holes by employment of the detent mechanism. The directional control member upper component upper end has a T-shaped configuration with generally horizontal passageway through the T-shaped configuration. The T-shaped configuration has a plurality of detent holes there in. The horizontal passageway has a pair of associated hand grips, with the hand grips each having an associated second detent mechanism associated there with, to allow the hand grips to be movably fixed to the T-shaped horizontal passageway of the upper component of the directional control member of the forward hand grip subassembly.

The forward hand grip subassembly directional control member upper component is located within the hollow tubular configuration of the lower component of the forward hand grip subassembly directional control member for allowing a user to slidably position, and locate, the upper component of the directional control member within the lower component of the directional control member, with the detents and the engageable clamp allowing the user to fix the upper component within the lower component thereby adjusting and fixing the location of the upper component and the lower component of the directional control member of the forward hand grip subassembly.

The associated hand grips of the horizontal passageway each have a flexible polymer end cap. Each hand grip has a round hollow tubular configuration. Each hand grip is located with the T-shaped horizontal passageway of the upper component of the directional control member of the forward hand grip subassembly. Each hand grip has an associated detent to allow the user to remove the hand grip from the T-shaped horizontal passageway of the upper component of the directional control member of the forward hand grip subassembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Scooter which has all of the advantages of the prior art, concerning scooters for transportation, and none of the disadvantages.

It is another object of the present invention to provide a new and improved Scooter which may be easily and efficiently manufactured and marketed.

It is further object of the present invention to provide a new and improved Scooter which is of durable and reliable constructions.

An even further object of the present invention is to provide a new and improved Scooter which is susceptible of a low cost of manufacture with regard to both materials and labor, and which accordingly is then susceptible of low prices of sale to the consuming public, thereby making such Scooter economically available to the buying public.

Even still another object of the present invention is to provide a Scooter which is light weight, and collapsible, for use as a transportation device.

Lastly, it is an object of the present invention to provide a new and improved Scooter comprising a base board and a pair of rear casters. A flexible band couples and coordinates the rotation of each of the rear caster wheels. The Scooter has a forward hand grip subassembly which comprises a mounting foot, a rearwardly directed leg, a tubular neck, a steering shaft, and a directional control member having a pair of associated hand grips coupled removably coupled thereto.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view taken along line 3-3 of FIG. 1.

FIG. 4 is a view taken along line 4-4 of FIG. 1.

The same reference numerals refer to the same parts throughout the various Figures.

DESCRIPTION OF THE PREFERRED EMBODIMENT

Figure 1:
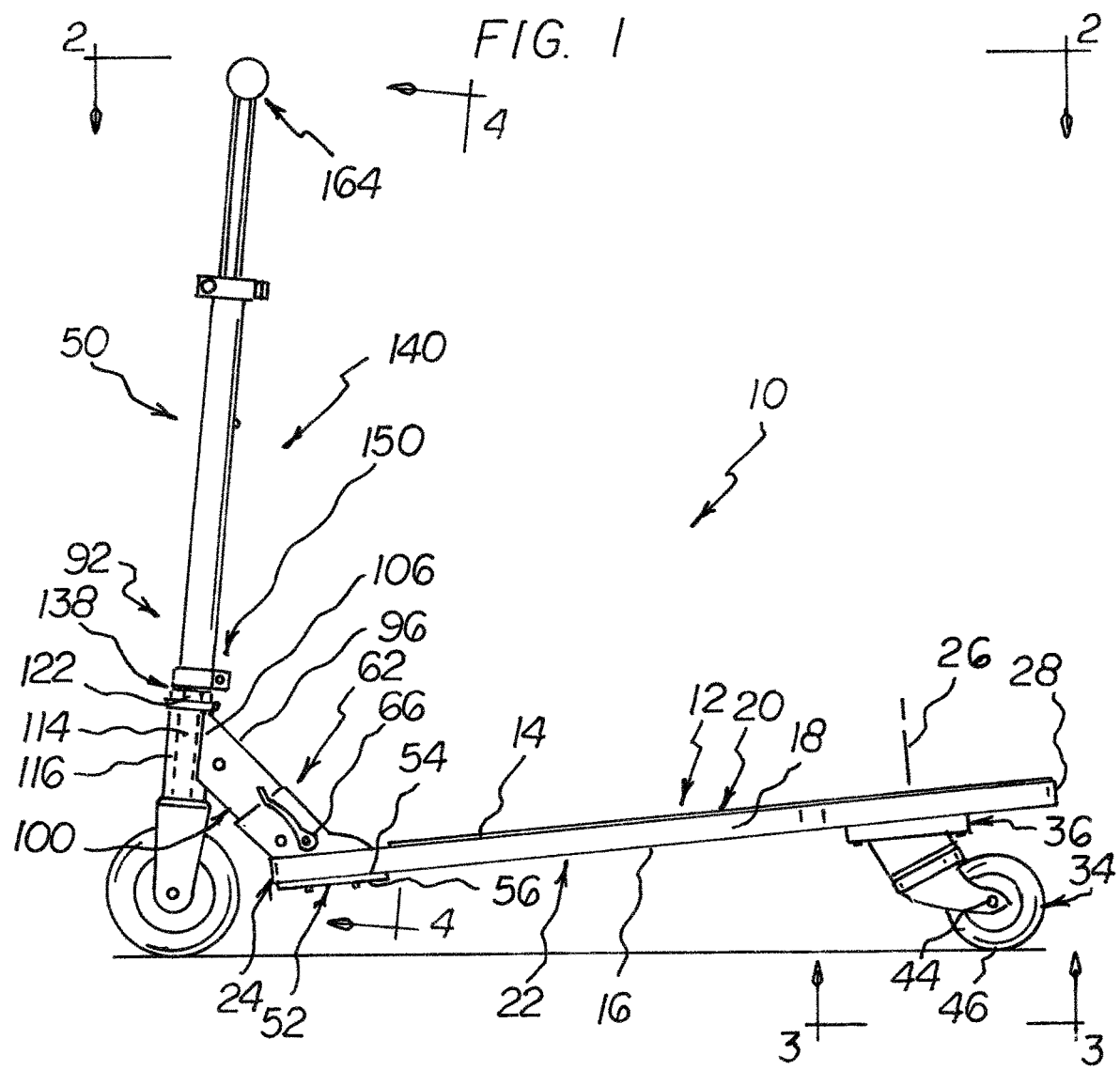
FIG. 1 is a side elevational view of the Scooter, showing the forward hand grip subassembly in the deployed orientation.
Figure 2:
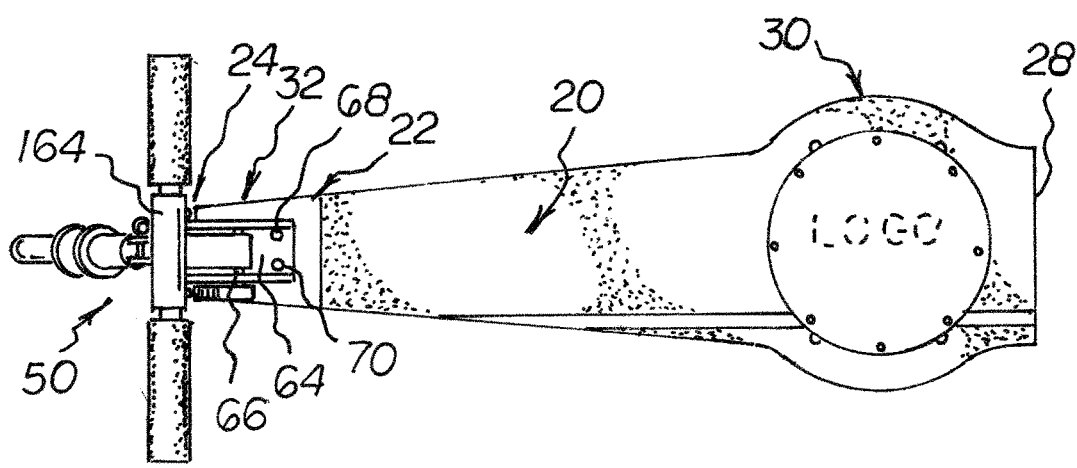
FIG. 2 is a view taken along line 2-2 of FIG. 1.
Figure 5:
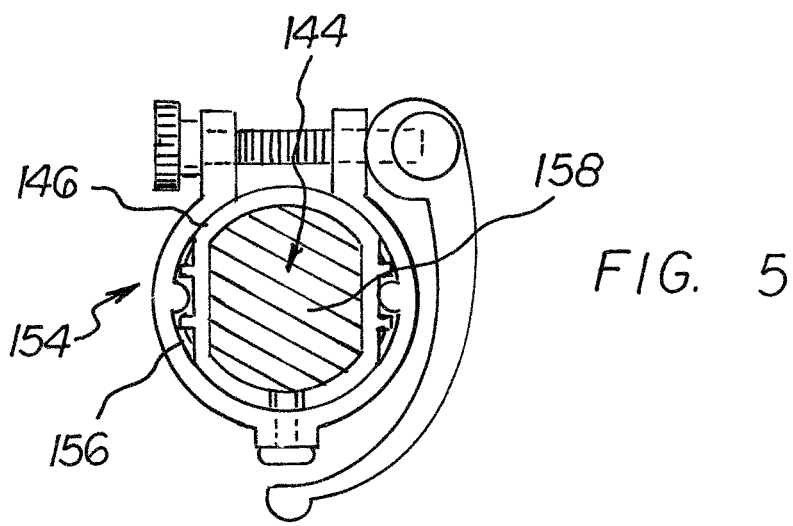
FIG. 5 is a view taken along line 5-5 of FIG. 4.
Figure 6:
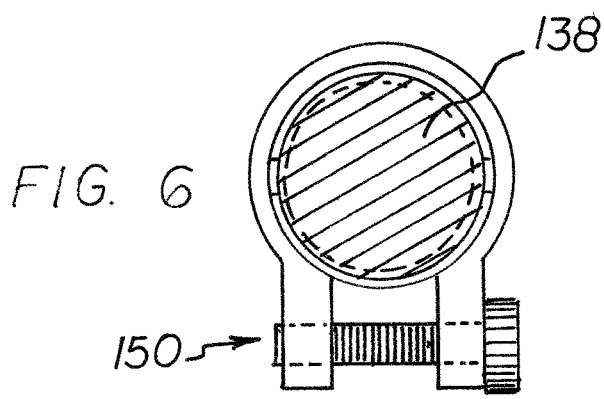
FIG. 6 is a view taken along line 6-6 of FIG. 4.
Figure 7:
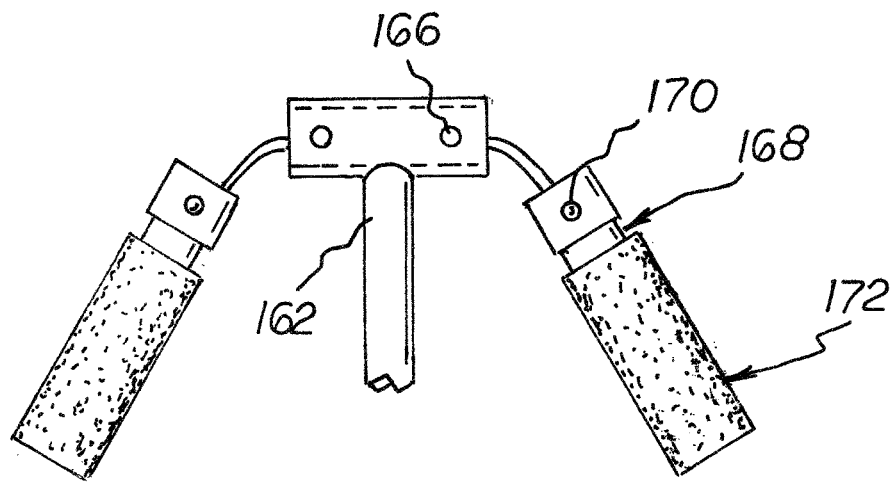
FIG. 7 is a disassembled view of the hand grips and the T-shaped horizontal passageway of the upper component of the directional control member of the forward hand grip subassembly, showing the detents and the detent holes.
Figure 8:
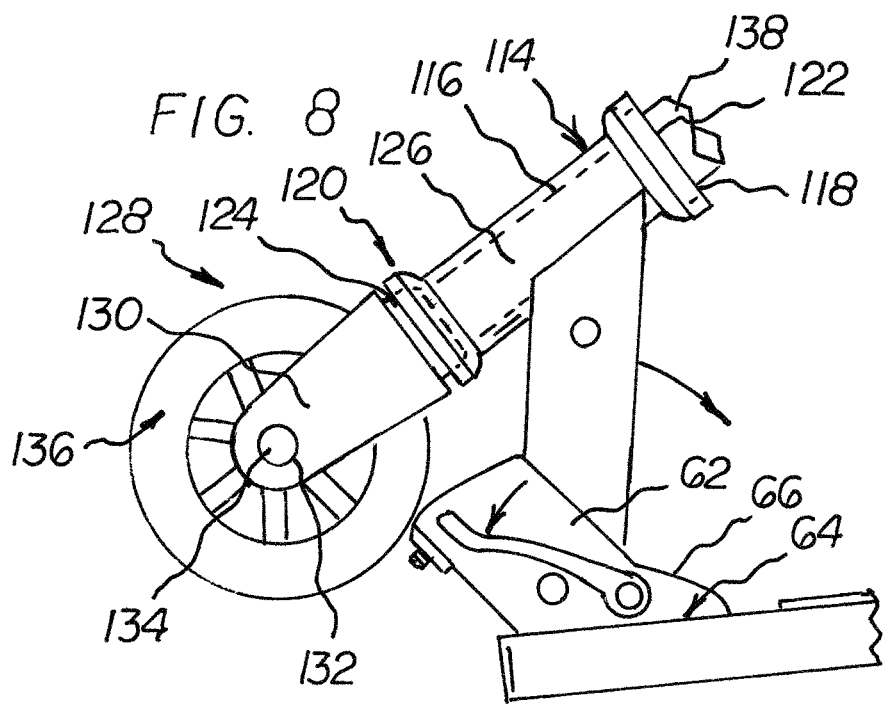
FIG. 8 is a close up view of the forward terminus of the base board and the forward hand grip subassembly, showing the front wheel, with the forward hand grip subassembly being moved toward the stored orientation.
Figure 9:
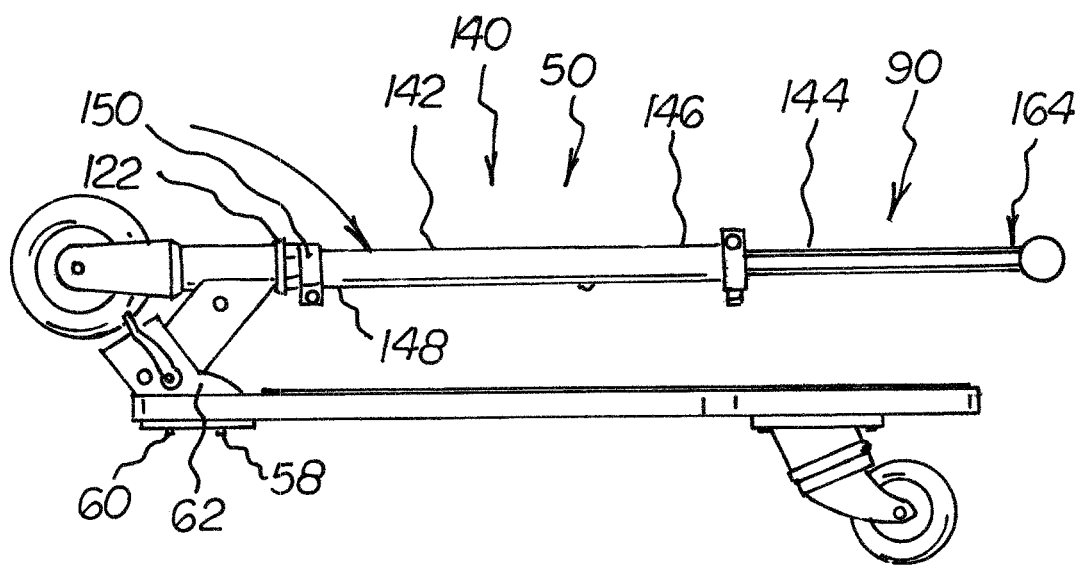
FIG. 9 shows the forward hand grip subassembly in the stored orientation.
Figure 10:
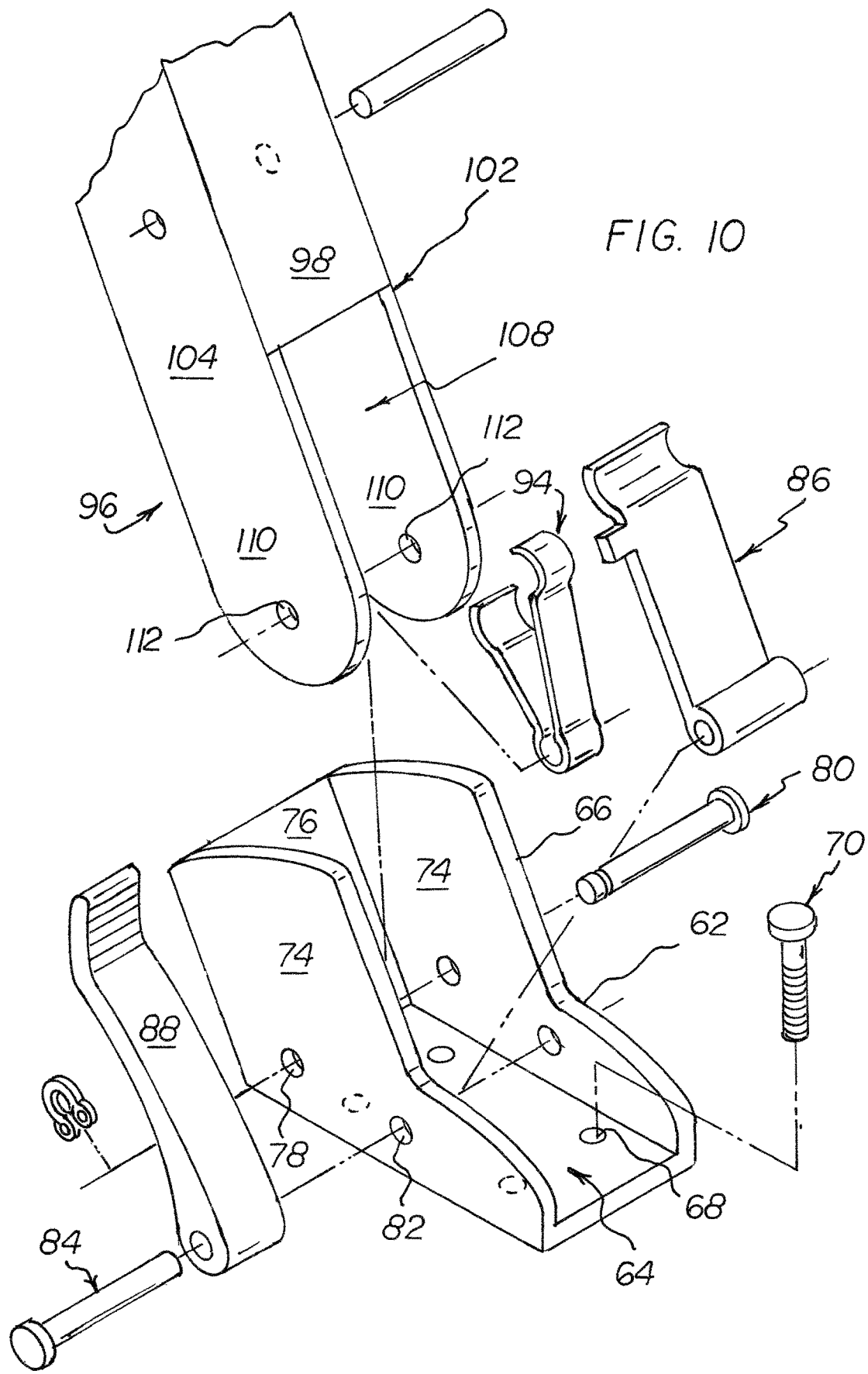
FIG. 10 is an exploded view showing the mounting foot, the rearwardly directed leg, as well as the locking mechanism, which allows the forward hand grip subassembly to be moved to and from the stored orientation, and locked in that orientation.

With reference now to the drawings, and in particular to FIG. 1 thereof, the preferred embodiment of the new and improved SCOOTER embodying the principles and concepts of the present invention and generally designated by the reference numeral 10 will be described.

The present invention, the Scooter, is comprised of a plurality of components. Such components in their broadest context include a base board, a pair of rear, rotatable wheels, a single, front wheel and a forward hand grip subassembly. Such components are individually configured and correlated with respect to each other so as to attain the desired objective.

A scooter 10 comprising several components, in combination, is herein described.

There is a base board 12. The base board has an upper surface 14 and a lower surface 16, with a height there between. The base board also has an edge 18, which is defined by the height between the upper surface and the lower surface of the base board. The upper surface of the base board having an abrasive coating 20.

The base board has a forward portion 22 and forward terminus 24. The base board has a rearward portion 26 and a rearward terminus 28. The base board has a length between the forward terminus and the rearward terminus. The rearward portion of the base board has a first width 30. The forward portion of the base board has a second width 32. The first width of the base board is greater than the second width of the base board. The upper surface abrasive coating which aids in the prevention of the slipping of a user's foot.

There is a pair of rear casters 34. The rear casters each have a base board contacting plate 36, with the base contacting plate of the rear casters having a plurality of associated fixing means 38. Fixing means are at least one of a class of fixing means which contains, bolts, snaps, clips, weldments, solders, pins, rivets, tongue and groove, threads, and wires.

Each of the rear casters has a fixed stanchion 40. Each of the rear casters has a rotating wheel mounting portion 42. Each of the rear caster wheel mounting portions has an associated axle 44 and an associated wheel 46. Each of the rear casters rotating wheel mounting portions is coupled by a flexible elastomeric band 48 which operates to coordinate the rotation of each of the rear caster wheel mounting portions.

The rotating wheel mounting portion of each of the rear casters has a defined location for the flexible elastomeric band. This location may be defined by raised ridges, so as to maintain the band in location on the rotating wheel mounting portions. The flexible elastomeric band location has a generally flat circumferential surface, to facilitate band movement and band retention in position. The flexible elastomeric band has a contacting surface, which rides on the band location on the rotating wheel mounting portions of the rear casters. The contacting surface of the band may be smooth or interrupted. In the preferred embodiment, the flexible elastomeric band is smooth. The construction of flexible bands for coordinating movement is well known in the art, and will not be discussed further.

There is a forward hand grip subassembly 50. The forward handgrip subassembly comprises several components, in combination. There is a forward hand grip subassembly lower mounting plate 52. The lower mounting plate of the forward hand grip subassembly has a generally rectilinear configuration, with an upper surface 54, a lower surface 56, and a width there between. The lower plate of the forward hand grip subassembly has a plurality of mounting bolt holes 58 there through, with a plurality of associated lower plate mounting bolts 60.

The forward hand grip subassembly has a mounting foot 62. The mounting foot of the forward hand grip subassembly has a generally C-shaped configuration, with a lower base board portion 64, and an upper portion 66, with a length there between. The lower base board portion of the mounting foot of the forward hand grip subassembly has generally rectilinear configuration with a plurality of bolt holes 68 there through. The lower base board portion of the mounting foot of the forward hand grip subassembly is coupled to the lower plate of the forward hand grip subassembly by the mounting bolts 70 which are associated with the lower plate of the forward hand grip subassembly. The lower plate mounting bolts passing through the lower plate, through the forward portion of the base board, and through the lower base board portion of the mounting foot.

The upper portion of the mounting foot of the forward hand grip subassembly having a left side 72, a right side 74, and a bottom surface 76 thereby forming a generally C-shaped upwardly oriented channel. The upwardly oriented channel has a pivot pin hole 78 running through the left side and the right side of the upper portion of the mounting foot with an associated pivot pin 80. The upwardly oriented channel of the mounting foot also has a lever mounting hole 82 through the left side and the right side of the upper portion of the mounting foot of the forward hand grip subassembly. The lever mounting hole has an associated lever mounting pin 84.

The C-shaped upwardly oriented channel has a position locking component which has a locking arm 86 and a locking arm lever 88. The locking arm and the locking arm lever are coupled to the lever mounting pin. The position locking component allows the forward hand grip subassembly to have a stored orientation 90 and a deployed orientation 92. The locking arm has an associated spring 94.

The forward hand grip subassembly has a rearwardly directed leg 96. The rearwardly directed leg having a generally rectilinear configuration with an upper surface 98, a lower surface 100, a right surface 102, and a left surface 104. The rearwardly directed leg having an upper end 106. The rearwardly directed leg having a lower opening 108 which has a pair of pivot pin tabs 110.

The forward hand grip subassembly rearwardly directed leg pivot pin tabs each have a tab pivot pin hole 112 there through. The tab pivot pin holes receive the pivot pin 80. The tab pivot pin rotatably couples the forward hand grip subassembly rearwardly directed leg and the forward hand grip subassembly mounting foot, with the locking component capable of maintaining the forward hand grip subassembly in the stored orientation 90 and in the deployed orientation 92.

The forward hand grip subassembly has a tubular neck 114. The rearwardly directed leg is fixedly coupled to the tubular neck. The tubular neck having a generally round passageway 116 there through. The tubular neck has a threaded upper end 118 and a threaded lower end 120. The tubular neck upper end and tubular neck lower end each containing a bearing therein, which is not shown, but is well known in the art. The upper end bearing and lower end bearing are held in position by a tubular neck upper nut 122 which is threadedly attached to the tubular neck upper end, and a tubular neck lower nut 124 which is threadedly attached to the tubular neck lower end.

The forward hand grip subassembly has a steering shaft 126. The steering shaft has a lower wheel end 128. The lower wheel end has a generally C-shaped configuration with a pair of wheel mounting tabs 130. The wheel mounting tabs of the steering shaft each have a wheel axle hole 132 there through. The wheel axle holes of the wheel mounting tabs have an associate wheel axle 134. The lower wheel end of the steering shaft has an associated front steering wheel 136. In the preferred embodiment, there is a single wheel, however, in other embodiments there may be more than one wheel. The steering shaft has an upper rotation end 138. The upper rotation end of the steering shaft of the forward hand grip subassembly is rotatably coupled to the tubular neck of the forward hand grip subassembly.

The forward hand grip subassembly has a directional control member 140. The directional control member of the forward hand grip subassembly has a lower component 142 and an upper component 144. The lower component of the directional control member has a generally rounded hollow tubular configuration, with an upper extent 146, a lower extent 148, and a length there between. The lower extent of the lower component of the directional control member has an associated clamp 150. The length between the lower extent and the upper extent of the lower component of the directional control member has a plurality of detent holes 152 therein. The upper extent of the lower component of the directional control member has a engageable clamp 154 with an associated polymer bushing 156.

The forward hand grip subassembly directional control member upper component has a generally oval configuration 158, with the oval configuration having a lower end 160 and an upper end 162, with a length there between. The length of the upper component of the directional control member has a first detent mechanism, not shown, but well known in the art, for allowing the upper component of the directional control member to be movably fixed to the lower component detent holes 152 by employment of the detent mechanism.

The directional control member upper component upper end has a T-shaped configuration 164 with generally horizontal passageway through the T-shaped configuration. The T-shaped configuration has a plurality of detent holes 166 there in. The horizontal passageway has a pair of associated hand grips 168, with the hand grips each having an associated second detent mechanism 170 associated there with (the detent mechanism not show, but well known in the art), to allow the hand grips to be movably fixed to the T-shaped horizontal passageway of the upper component of the directional control member of the forward hand grip subassembly. The forward hand grip subassembly directional control member upper component is located within the hollow tubular configuration of the lower component of the forward hand grip subassembly directional control member for allowing a user to slidably position, and locate, the upper component of the directional control member within the lower component of the directional control member, with the detents and the engageable clamp allowing the user to fix the upper component within the lower component thereby adjusting and fixing the location of the upper component and the lower component of the directional control member of the forward hand grip subassembly.

The associated hand grips of the horizontal passageway each have a flexible polymer end cap 172. Each hand grip has a round hollow tubular configuration. Each hand grip is located within the T-shaped horizontal passageway of the upper component of the directional control member of the forward hand grip subassembly. Each hand grip has an associated detent to allow the user to remove the hand grip from the T-shaped horizontal passageway of the upper component of the directional control member of the forward hand grip subassembly.

In the prior art, Wells U.S. Pat. No. 9,186,570, a skateboard is described. The skateboard has a set of front, rotatable wheels, which are coupled with an elastomeric band. In the present invention, the rotatable wheels (side to side rotation) are located at the rear of the board, with only a single wheel being present on the front end of the board. In use, a user shifts their weight from side to side, causing a sinuous motion of the rear of the board, causing the sidewards motion to be transformed into forward motion, propelling the board, and the user, forward. This movement allows a user to propel the board up an inclined surface, such as a rise in a sidewalk, driveway, or parking area, without having to push, the user's foot against the sidewalk, driveway, or parking area surface. On a level surface, the sinuous motion may propel a user forward, with a greater velocity, than might be attained using one's foot to propel the scooter forward. The forward hand grip subassembly allows a user to remain on course, which the user moves the rear of the scooter in a side to side motion. Additionally, the forward hand grip subassembly provides a hand hold for the user, aiding in keeping balance on the moving surface of the Scooter. The practicality of the Scooter is enhanced by the locking mechanism, which allows the forward hand grip subassembly to be in a stored orientation or a deployed orientation. This allows the scooter to be folded into the stored orientation and readily carried in a backpack, as is a simple skateboard. When in the stored orientation, the Scooter may be stored in a locker, such as is commonly found in schools, making the use of the Scooter more practical, and convenient for people to use, going to, and from, school.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A scooter comprising, in combination:
   a base board, the base board having an upper surface and a lower surface with a height there between, the base board also having an edge which is defined by the height between the upper surface and the lower surface of the base board, the base board having a forward portion and forward terminus, the base board having a rearward portion and a rearward terminus, the base board having a length between the forward terminus and the rearward terminus
   a pair of rear casters, each of the rear casters having a fixed stanchion and each of the rear casters having a rotating wheel mounting portion, each of the rear caster wheel mounting portions having an associated axle and an associated wheel, each of the rear casters rotating wheel mounting portions being coupled by a flexible band which operates to coordinate the rotation of each of the rear caster wheel mounting portions, the pair of rear casters being fixedly coupled to the base board of the scooter;
   a forward hand grip subassembly, comprising, in combination:
      a mounting foot;
      a rearwardly directed leg;
      a tubular neck, the rearwardly directed leg being fixedly coupled to a tubular neck, with the tubular neck having a generally round passageway there through;
      a steering shaft, the steering shaft having an upper rotation end and a middle portion and a lower portion, the steering shaft middle portion of the forward hand grip subassembly being rotatably coupled to the tubular neck of the forward hand grip subassembly, the steering shaft lower portion having a lower wheel end, with an associated front steering wheel and an associated front steering wheel axle; and
      a directional control member, the directional control member having a lower portion and an upper portion, the lower portion of the directional control member having a generally rounded hollow tubular configuration with an upper extent and a lower extent and a length there between, the lower extent of the directional control member being fixed to the upwardly directed upper rotation end of the steering shaft, the directional control member upper portion having a generally oval configuration with the oval configuration having a lower end and an upper end with a length there between, the directional control member upper portion having an upper end with the upper end of the directional control member upper portion having a T-shaped configuration with generally horizontal passageway through the T-shaped configuration, the horizontal passageway having a pair of associated hand grips, the forward hand grip subassembly directional control member upper portion being located within the hollow tubular configuration of the directional control member lower portion of the forward hand grip subassembly for allowing a user to slidably position and locate the upper portion of the directional control member within the lower portion of the directional control member with the detents and the engageable clamp allowing the user to fix the upper portion within the lower portion thereby adjusting and fixing the location of the upper portion and the lower portion of the directional control member of the forward hand grip subassembly.

2. The scooter as described in claim 1, with the scooter further comprising the steering shaft upper rotation end having a threaded portion with an associated lock nut, the steering shaft upper rotation end having an upwardly directed end portion, the lower portion of the steering shaft of the forward hand grip subassembly having a generally C-shaped configuration with a pair of wheel mounting tabs, the wheel mounting tabs of the steering shaft each having a wheel axle hole there through, with the wheel axle holes of the wheel mounting tabs containing the associate wheel axle.

3. The scooter as described in claim 2, with the scooter further comprising the lower extent of the directional control member lower portion having an associated clamp which fixes the lower extent of the lower portion of the directional control member to the upper rotation end of the steering shaft.

4. The scooter as described in claim 3, with the scooter further comprising:
the mounting foot of the forward hand grip subassembly having a generally C-shaped upwardly oriented channel, with the mounting foot of the forward hand grip subassembly having a lower base board portion and an upper portion with a length there between;
the directional control member lower portion having a plurality of detent holes therein, the upper extent of the directional control member lower portion having a engageable clamp with an associated polymer bushing; and
the horizontal passageway of the directional control member upper portion upper end having a generally round hollow tubular configuration with a plurality of detent holes there in.

5. The scooter as described in claim 4, with the scooter further comprising:
the upper portion of the mounting foot of the forward hand grip subassembly having a left side and a right side and a bottom surface thereby forming the generally C-shaped upwardly oriented channel;
the length of the upper portion of the directional control member having a first detent mechanism for allowing the upper rotation end of the steering shaft to be movably fixed to the lower portion detent holes by employment of the detent mechanism; and
the hand grips each having an associated second detent mechanism associated there with, to allow the hand grips to be movably fixed to the T-shaped horizontal passageway of the upper component of the steering shaft of the forward hand grip subassembly.

6. The scooter as described in claim 5, with the scooter further comprising:
the lower base board portion of the mounting foot of the forward handgrip subassembly having a having generally rectilinear configuration, with a lower mounting plate being coupled to the lower base portion of the mounting foot of the forward hand grip assembly of the forward portion of the base board of the scooter, the lower mounting plate being located on the lower surface of the forward portion of the base board of the scooter, the lower mounting plate having a plurality of bolt holes there through, with the lower mounting plate bolt holes having a plurality of associated lower mounting plate bolts, the lower base board portion of the mounting foot of the forward hand grip subassembly is fixedly coupled to the lower mounting plate of the forward hand grip subassembly by the mounting bolts which are associated with the lower plate of the forward hand grip subassembly, with the mounting bolts passing through the forward portion of the base board;
the rearwardly directed leg of the forward hand grip subassembly having a generally rectilinear configuration with an upper surface and a lower surface and a right surface and a left surface with an upper opening and a lower opening having a pair of pivot pin tabs, the forward hand grip subassembly rearwardly directed leg pivot pin tabs each having a tab pivot pin hole there through, with the tab pivot pin holes having an associated tab pivot pin, the tab pivot pin rotatably coupling the forward hand grip subassembly rearwardly directed leg and the forward hand grip subassembly mounting foot with the locking component capable of maintaining the forward hand grip subassembly in a deployed orientation and in a stored orientation; and
the upwardly oriented channel of the upper portion of the mounting foot of the forward hand grip subassembly having a pivot pin hole running through the left side and the right side of the upper portion of the mounting foot, the upwardly oriented channel of the mounting foot also having a lever mounting hole through the left side and the right side of the upper portion of the mounting foot of the forward hand grip subassembly, with the lever mounting hole having an associated lever mounting pin.

7. The scooter as described in claim 6, with the scooter further comprising:
the pair of rear casters having a base board contacting plate, with the base contacting plate of the rear casters having a plurality of fixing means, the stanchions of the rear casters each being coupled to the base board contacting plate;
the lower base board portion and lower mounting plate of the forward hand grip subassembly having a generally rectilinear configuration with an upper surface and a lower surface and a width there between; and
the C-shaped upwardly oriented channel of the mounting foot of the forward hand grip subassembly having a position locking component, the position locking component having a locking arm and a locking arm lever, with the locking arm and the locking arm lever being coupled to the lever mounting pin, the position locking component allowing the forward hand grip subassembly to have a stored orientation and a deployed orientation, the locking arm having an associated spring.

8. The scooter as described in claim 7, with the scooter further comprising:
the rearward portion of the base board having a first width, the forward portion of the base board having a second width; and
the hand grips each having a flexible polymer grip, each hand hold having a round hollow tubular configuration, each hand hold being located with the T-shaped horizontal passageway of the upper component of the steering shaft of the forward hand grip subassembly.

9. The scooter as described in claim 8, with the scooter further comprising:
the first width of the base board being greater than the second width of the base board; and
each hand grip having an associated detent to allow the user to remove the hand hold from the T-shaped horizontal passageway of the upper component of the steering shaft of the forward hand grip subassembly.

10. The scooter as described in claim 9, with the scooter further comprising the upper surface of the base board having an abrasive coating.

11. A scooter comprising, in combination:
a base board, the base board having an upper surface with a height there between, the base board also having an edge which is defined by the height between the upper surface and the lower surface of the base board;
a pair of rear casters, each of the rear casters having a fixed stanchion and each of the rear casters having a rotating wheel mounting portion with an associated wheel and an associated axle, each of the rear casters rotating wheel mounting portions being coupled by a flexible band which operates to coordinate the rotation of each of the rear caster wheel mounting portions, the pair of rear casters being fixedly coupled to the base board of the scooter; and
a forward hand grip subassembly, comprising, in combination:
a mounting foot coupled to the base board;
a rearwardly directed leg being coupled to the mounting foot;
a tubular neck, the rearwardly directed leg being fixedly coupled to a tubular neck;
a steering shaft coupled to the tubular neck of the forward hand grip subassembly, the steering shaft having at least one associated front steering wheel and an associated front steering wheel axle; and
a directional control member fixedly coupled to the steering shaft, the directional control member having an upper portion with the upper portion of the directional control member having a pair of associated hand grips coupled removably coupled thereto.

* * * * *